US009652943B1

(12) United States Patent
Parker

(10) Patent No.: US 9,652,943 B1
(45) Date of Patent: May 16, 2017

(54) ELECTRONIC PLAY CALLING DEVICE, SYSTEM, AND PROCESS

(71) Applicant: John Robert Parker, Riverside, CA (US)

(72) Inventor: John Robert Parker, Riverside, CA (US)

( * ) Notice: Subject to any disclaimer, the term of this patent is extended or adjusted under 35 U.S.C. 154(b) by 251 days.

(21) Appl. No.: 14/261,701

(22) Filed: Apr. 25, 2014

Related U.S. Application Data

(60) Provisional application No. 61/816,506, filed on Apr. 26, 2013.

(51) Int. Cl.

| | |
|---|---|
| ***G08C 17/02*** | (2006.01) |
| ***G05B 11/01*** | (2006.01) |
| ***G06T 11/00*** | (2006.01) |
| ***G08B 5/36*** | (2006.01) |

(52) U.S. Cl.
CPC ............... *G08B 5/36* (2013.01); *G08C 17/02* (2013.01)

(58) Field of Classification Search
CPC ...................................................... G08C 19/16
USPC ...................................................... 340/12.54
See application file for complete search history.

(56) References Cited

U.S. PATENT DOCUMENTS

| | | | | |
|---|---|---|---|---|
| 2,431,780 | A * | 12/1947 | Theal | A45F 3/14 224/157 |
| 2003/0225599 | A1* | 12/2003 | Mueller | G06Q 10/02 705/5 |
| 2007/0143382 | A1* | 6/2007 | Luster | A63B 24/0021 708/100 |
| 2010/0172624 | A1* | 7/2010 | Watts | H04N 5/77 386/278 |
| 2010/0315777 | A1* | 12/2010 | Dreher | H05K 5/02 361/695 |
| 2011/0225553 | A1* | 9/2011 | Abramson | G06F 3/0481 715/863 |
| 2012/0224318 | A1* | 9/2012 | Carleton | A45F 5/00 361/679.26 |
| 2012/0242669 | A1* | 9/2012 | Weiler | G06F 17/211 345/467 |

* cited by examiner

*Primary Examiner* — Joseph Feild
*Assistant Examiner* — John Mortell
(74) *Attorney, Agent, or Firm* — Plager Schack LLP

(57) ABSTRACT

An electronic play calling device, system, process is disclosed for calling plays displaying encoded representations associated with the plays is displayed on an electronic display board adjacent to a playing field. The electronic play calling device includes a play calling board, a power source, and several LED lights attached to the board and configured to illuminate a translated signal that is visible to a set of players on the playing field.

16 Claims, 12 Drawing Sheets

ELECTRONIC PLAY CALLING DEVICE, SYSTEM, AND PROCESS

CLAIM OF BENEFIT TO PRIOR APPLICATION

This application claims benefit to U.S. Provisional Patent Application 61/816,506, entitled "ELECTRONIC PLAY CALLING DEVICE AND SYSTEM," filed Apr. 26, 2013. The U.S. Provisional Patent Application 61/816,506 is incorporated herein by reference.

BACKGROUND

Many sports are competitive in nature, and therefore, those who participate in competitive sports typically hide their play calling from opposing teams. Secret play calling in competitive sports typically involves a play caller and a messenger. Usually the play caller is the coach and the messenger is a player. In this scheme, the coach can tell the messenger the play and the messenger subsequently reveals the secret play to teammates during play. For example, a football coach may send a substitute player out to the team huddle to reveal the secret play to the team. However, secret play calling has traditionally been prone to attenuation error and miscommunication. Like the youthful game of telephone in which an initial message loses semantic meaning as the message gets quietly passed from one child to the next, the traditional coach-messenger paradigm suffers from lose of meaning and interpretation inaccuracies.

To deal with the problems of traditional coach-messenger secret play calling, other schemes have evolved. For instance, instead of sending in named plays, the coach can device a coded system that matches each play to a unique code. In this scheme, the coach or a player could announce the code of any particular play to all members of the team. Moreover, the code could be announced loudly for anyone to hear, but the play would remain a secret that could only be deciphered by a person who understands the coach's code system. Instead of yelling out coded plays, a coach could alternatively (or in conjunction with vocalizing the coded play) display a sign with the code for the play. By holding up the sign, the players on the team would be able to see the code and thereby execute the associated play. However, like the coach-messenger play calling scheme, the coded play calling schemes (i.e., vocalizing play codes and/or displaying play codes on signs) to date have suffered a number of drawbacks. Specifically, calling plays by vocalizing (e.g., yelling) play codes depends on the hearing ability of each player and the level of background and/or ambient noise in the vicinity of the play calling. For example, some players may have general difficulty hearing while other players have trouble hearing because of equipment they use during play (e.g., a football helmet might block part or all of a player's ears). Also, crowd noise is a well-known issue that daunts even the most talented players. For instance, opposing teams playing in a domed football stadium typically suffer communication breakdowns due to crowd noise.

In addition, all of the existing schemes for calling plays are slow. It typically takes time for the coach to tell a substitute player which play the team should execute, time for the player to run out onto the field and inform the other players about the play, and finally execute the play. Likewise, it takes time for a coach to select a play to call, write a code for the play on a visible sign, and then hold up the sign in the line of sight of each player. In these play calling schemes, for example, the time involved for calling the play, conveying the play call to the team, and finally executing the play might be in the range of 20-35 seconds. This often leaves a small margin for correcting errors (e.g., football typically permits 45 seconds for a play to be called).

Thus, what is needed is the ability from the sideline to quickly call plays that only certain players can understand and whose accuracy does not break down during communication.

BRIEF SUMMARY

Some embodiments of the invention include a novel electronic play calling device for calling plays on a sports field. The electronic play calling device comprises a play calling board, a battery, and a plurality of lights attached to the board and configured to illuminate a translated signal that is visible to a set of football players on the football field. The electronic play calling device of some embodiments further comprises a direct current (DC) power source. In other embodiments, it is an Alternating current (AC) power source. In some embodiments, the plurality of lights are LED lights. In some embodiments, the battery is a rechargeable battery.

The electronic play calling device of some embodiments further comprises a remote control transmitter for selecting coded plays to display on the board. The remote control of some embodiments transmits coded play selections to the electronic board by at least one of infrared (IR) signals, radio frequency (RF) signals, and WiFi signals. In some embodiments, the remote control transmitter comprises a mobile computing device and an application for selecting coded plays to transmit to the electronic board. In some embodiments, the mobile computing device is a tablet computing device.

The electronic play calling device of some embodiments further comprises a stand for displaying the board at any position visible from the field. In some embodiment, the stand has a set of wheels for rolling the stand with the electronic play calling device to different positions. In some embodiments, the stand is a plastic stand that can be adjusted to change the height of the board. The electronic play calling device of some embodiments further comprises a case for transporting the play calling device.

In some embodiments, the electronic play calling device is part of a play calling system that includes a plurality of play calling devices and a set of rails for moving the electronic play calling device along the sideline of a football field. In some embodiments, the power source provides power to each of the plurality of play calling devices. In some embodiments, the remote control transmits signals to each of the plurality of play calling devices.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
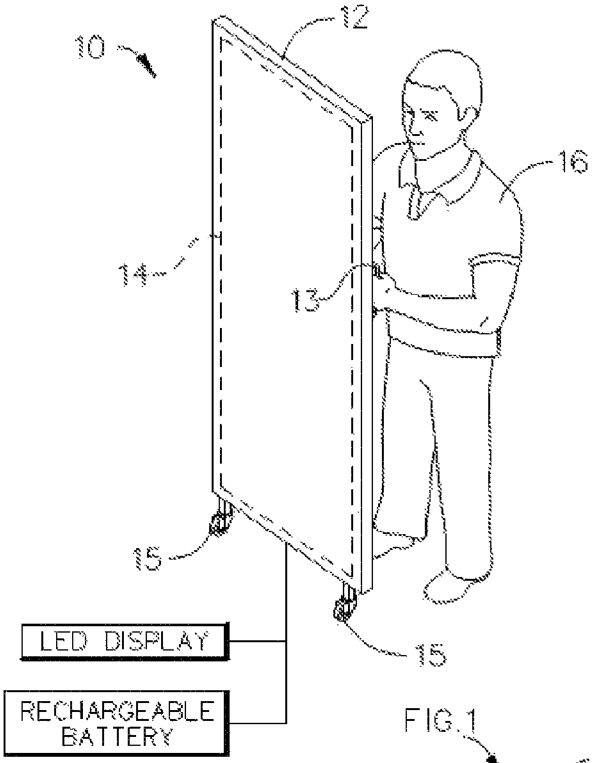

Having thus described the invention in general terms, reference is now made to the accompanying drawings, which are not necessarily drawn to scale, and wherein:

FIG. 1 conceptually illustrates a first electronic play caller in some embodiments.

Figure 2:
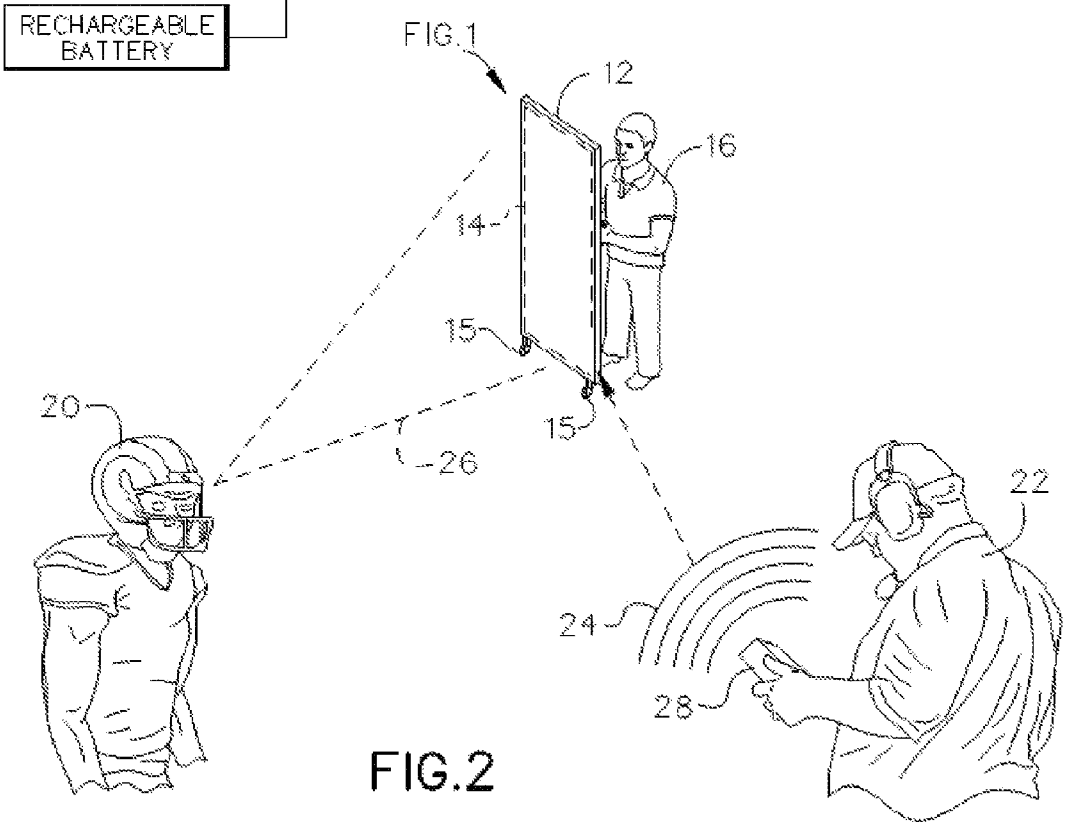

FIG. 2 conceptually illustrates usage in some embodiments of the first electronic play caller.

Figure 3:
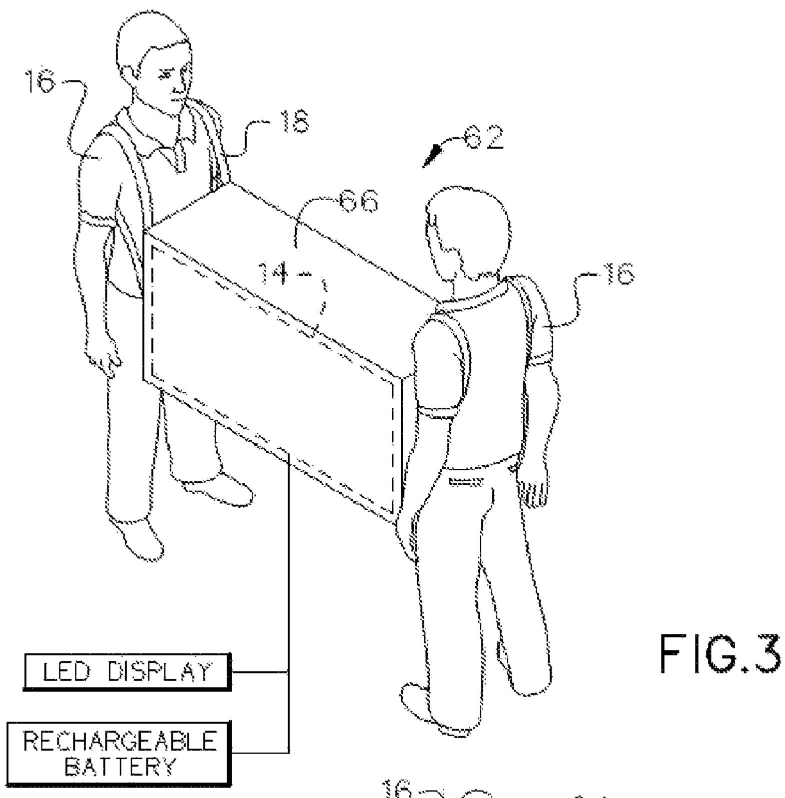

FIG. 3 conceptually illustrates a second electronic play caller in some embodiments.

Figure 4:
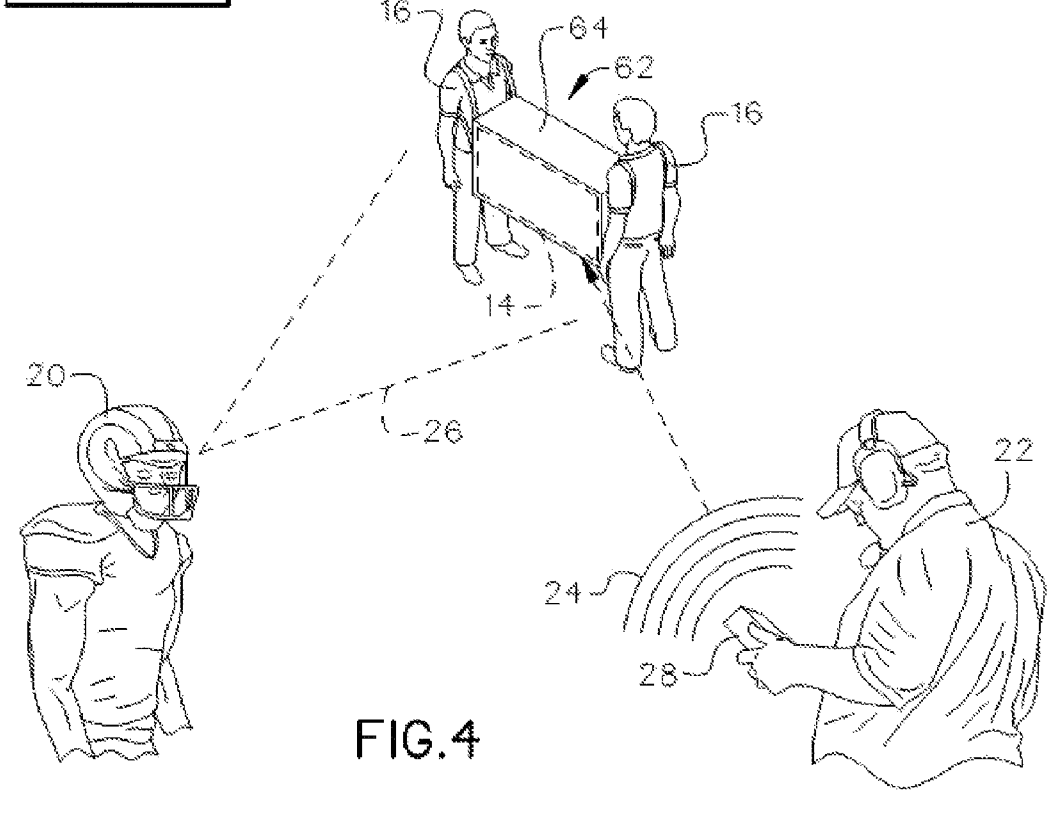

FIG. 4 conceptually illustrates usage in some embodiments of the second electronic play caller.

Figure 5:
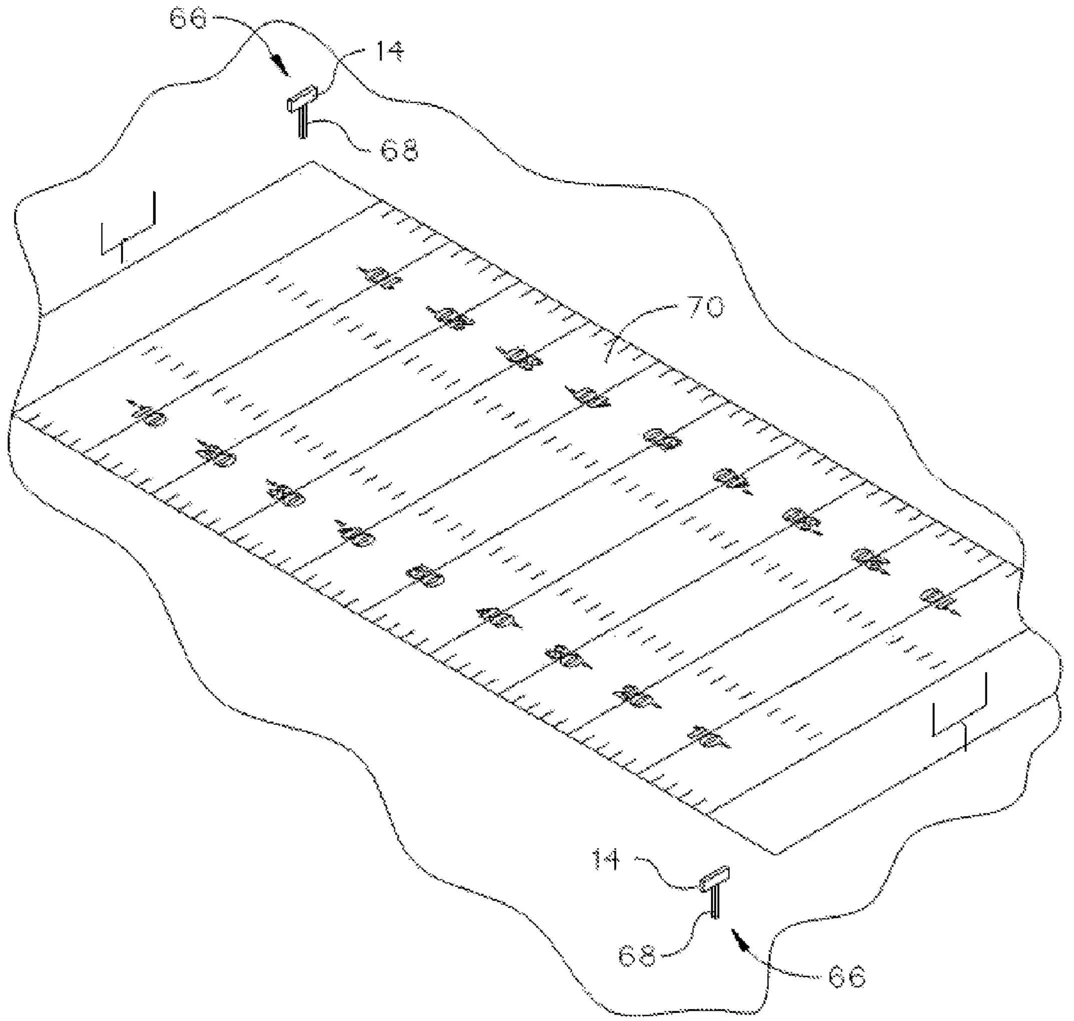

FIG. 5 conceptually illustrates pole-mounted electronic play callers in some embodiments.

Figure 6:
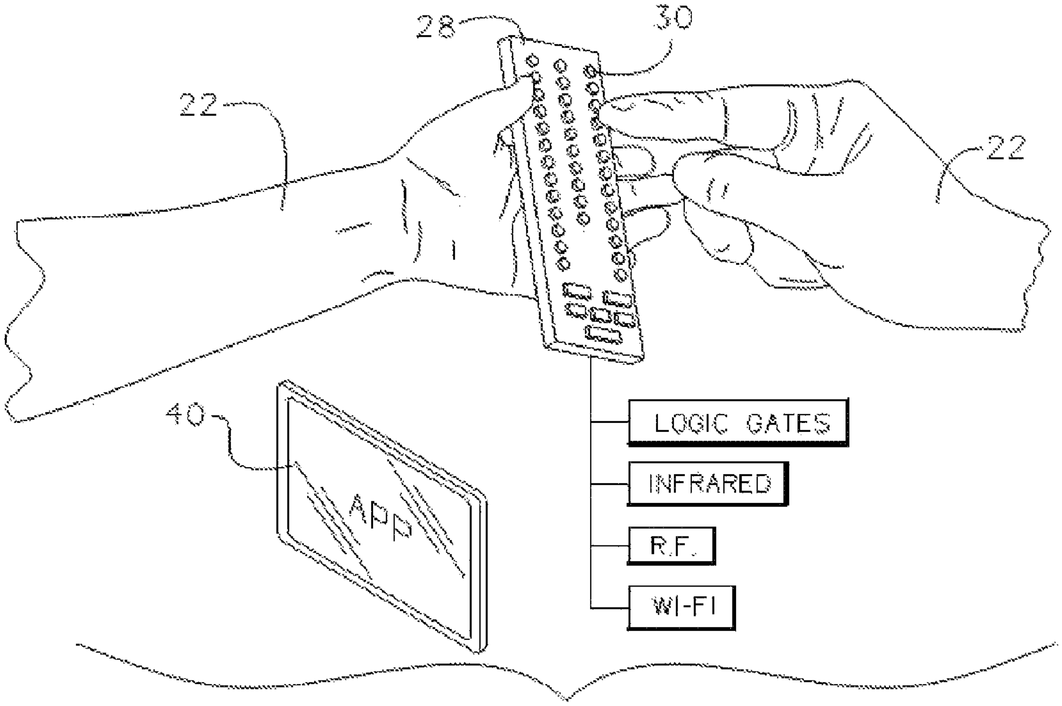

FIG. 6 conceptually illustrates a set of signal transmitting devices including a remote control transmitter and a mobile computing device for controlling an electronic play caller in some embodiments.

Figure 7:
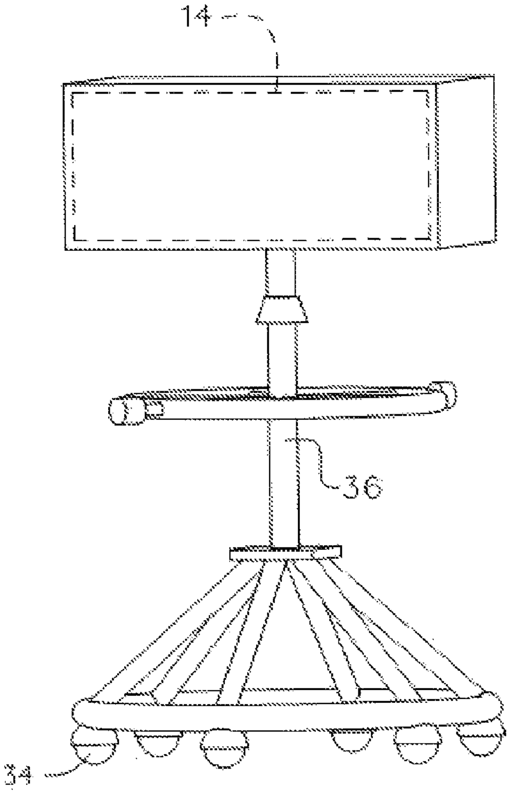

FIG. 7 conceptually illustrates an electronic play caller of some embodiments mounted on a mobile display stand having a set of wheels.

Figure 8:
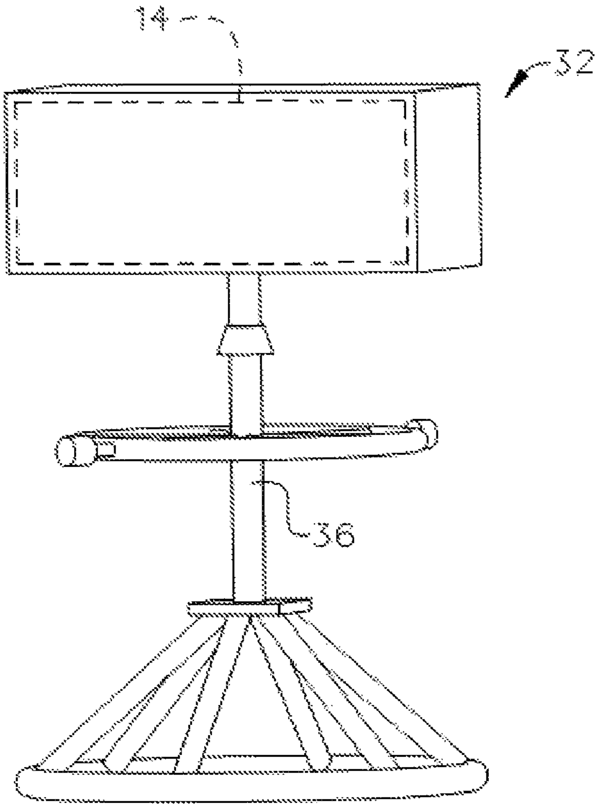

FIG. 8 conceptually illustrates an electronic play caller of some embodiments mounted on a stationary display stand.

Figure 9:
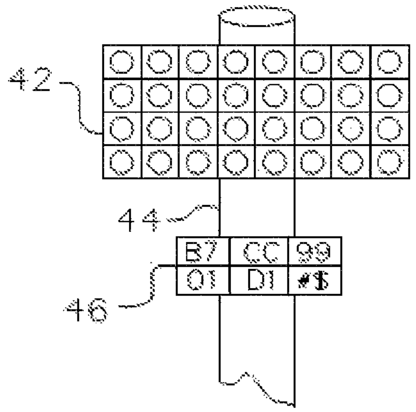

FIG. 9 conceptually illustrates a large form electronic play caller of some embodiments mounted on a stadium light pole.

Figure 10:
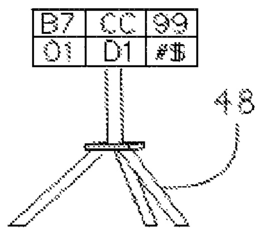

FIG. 10 conceptually illustrates an electronic play caller of some embodiments mounted on a tripod.

Figure 11:
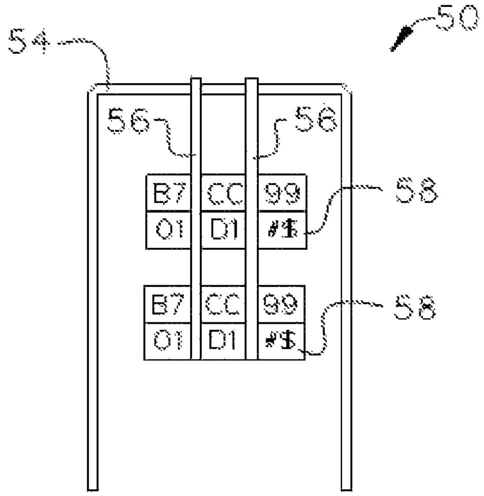

FIG. 11 conceptually illustrates a free-standing electronic play caller in some embodiments.

Figure 12:
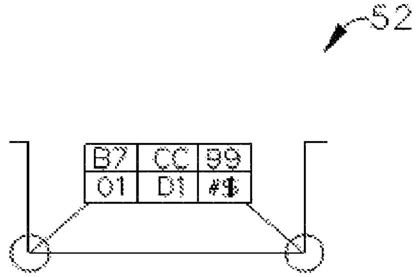

FIG. 12 conceptually illustrates a mobile electronic play caller in some embodiments.

Figure 13:
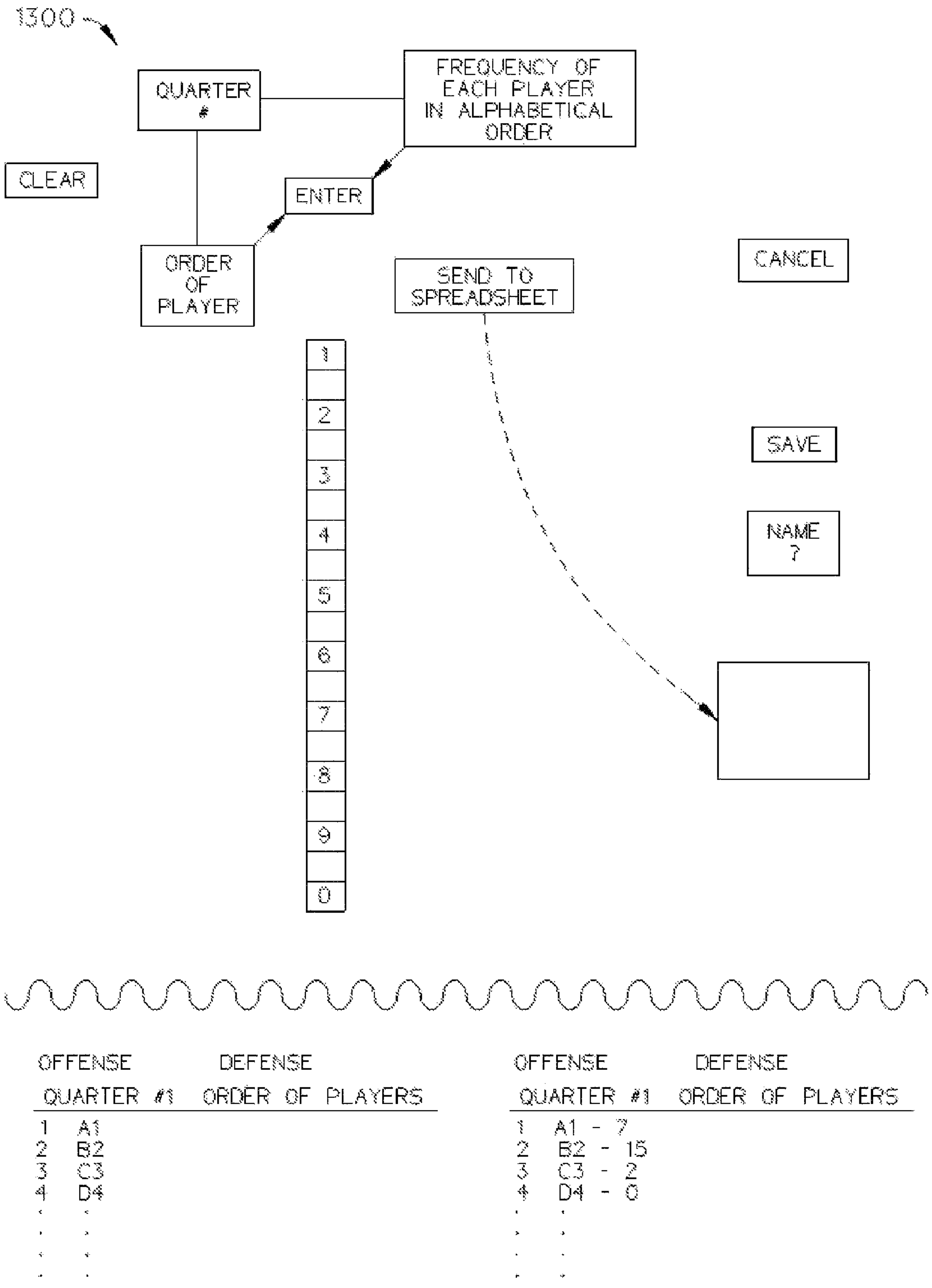

FIG. 13 conceptually illustrates a schematic of a system for controlling an electronic play caller in some embodiments.

Figure 14:
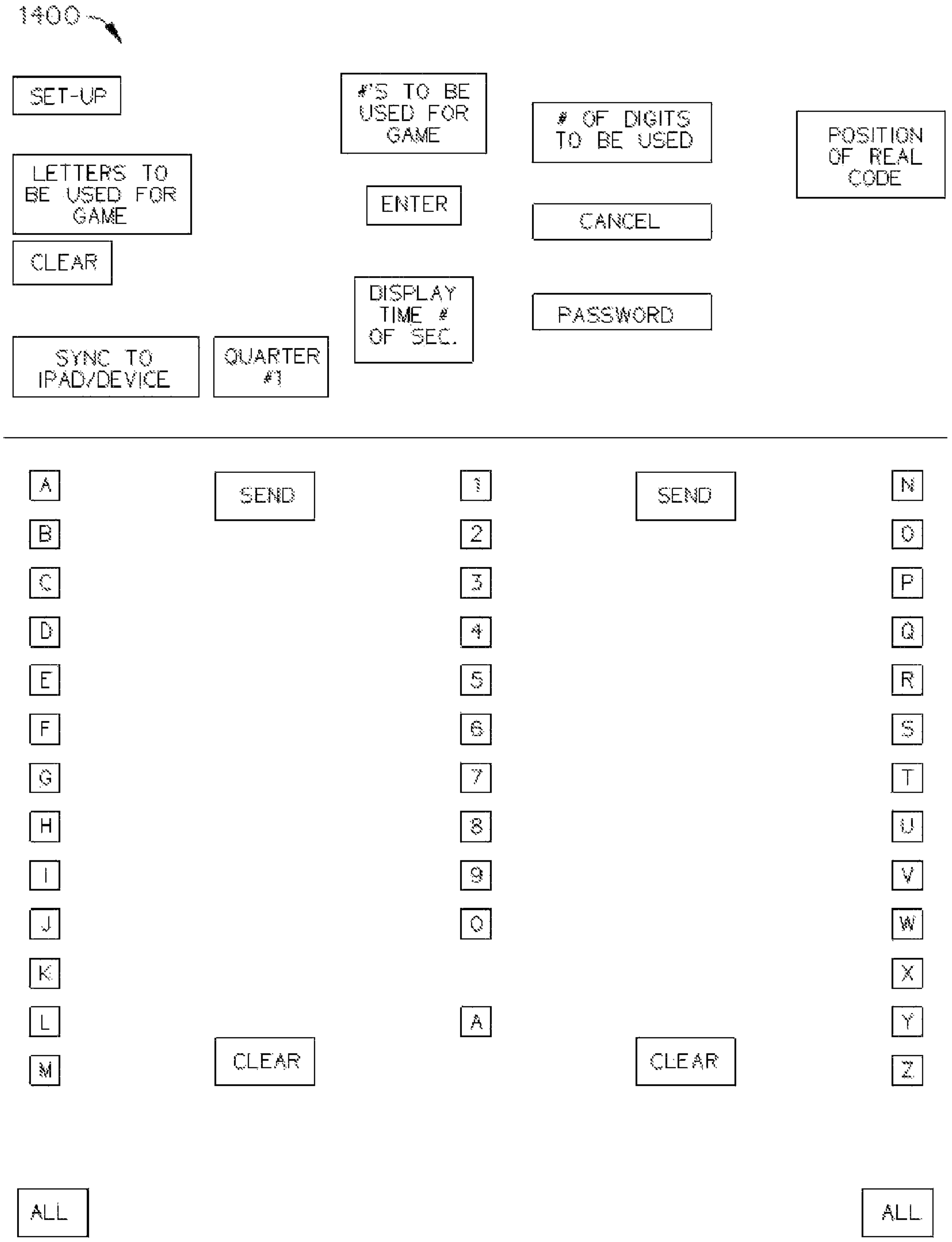

FIG. 14 conceptually illustrates a schematic of a mobile computing device application interface for controlling an electronic play caller in some embodiments.

Figure 15:
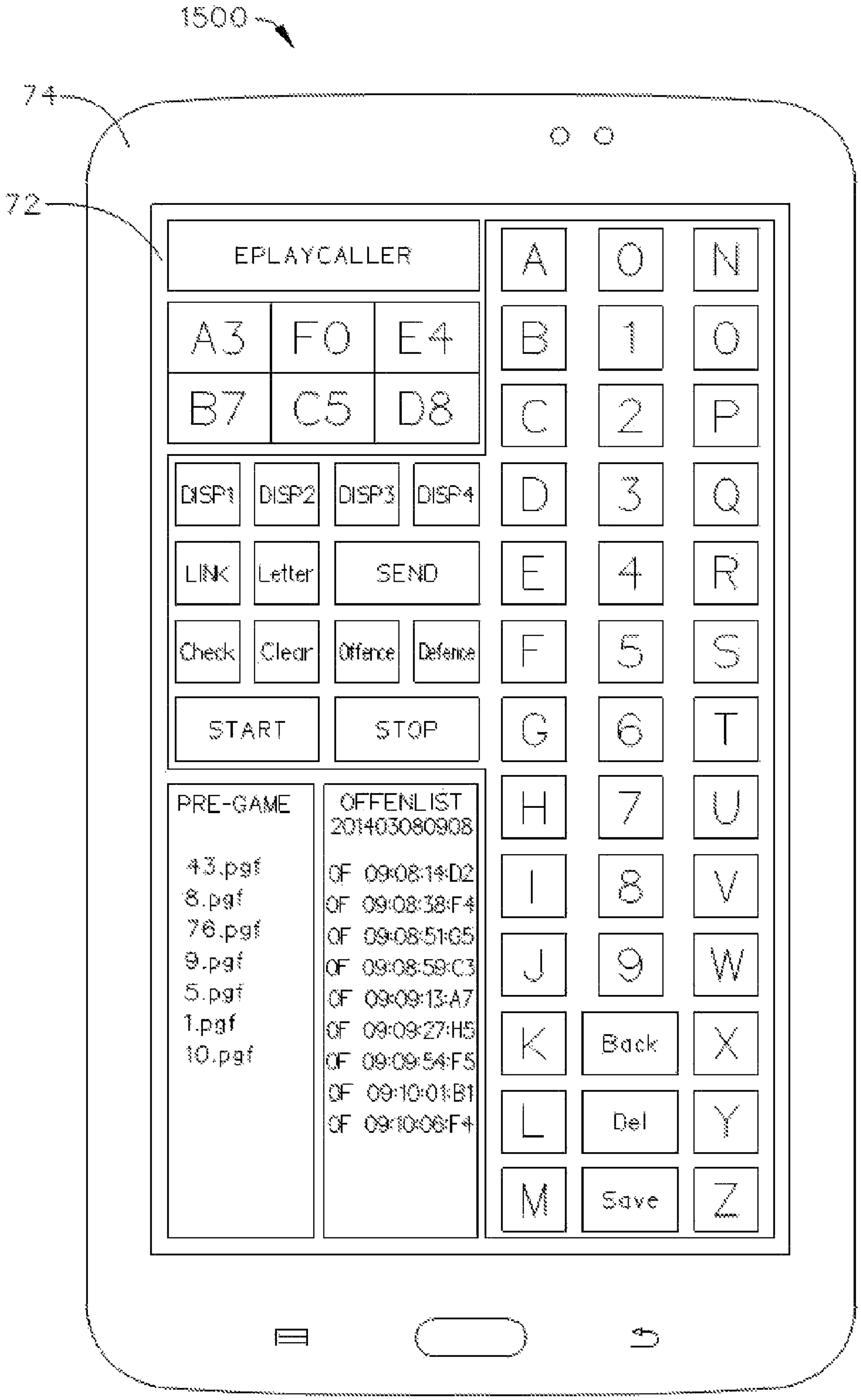

FIG. 15 conceptually illustrates an example of a graphical user interface of an application for controlling an electronic play caller in some embodiments.

Figure 16:
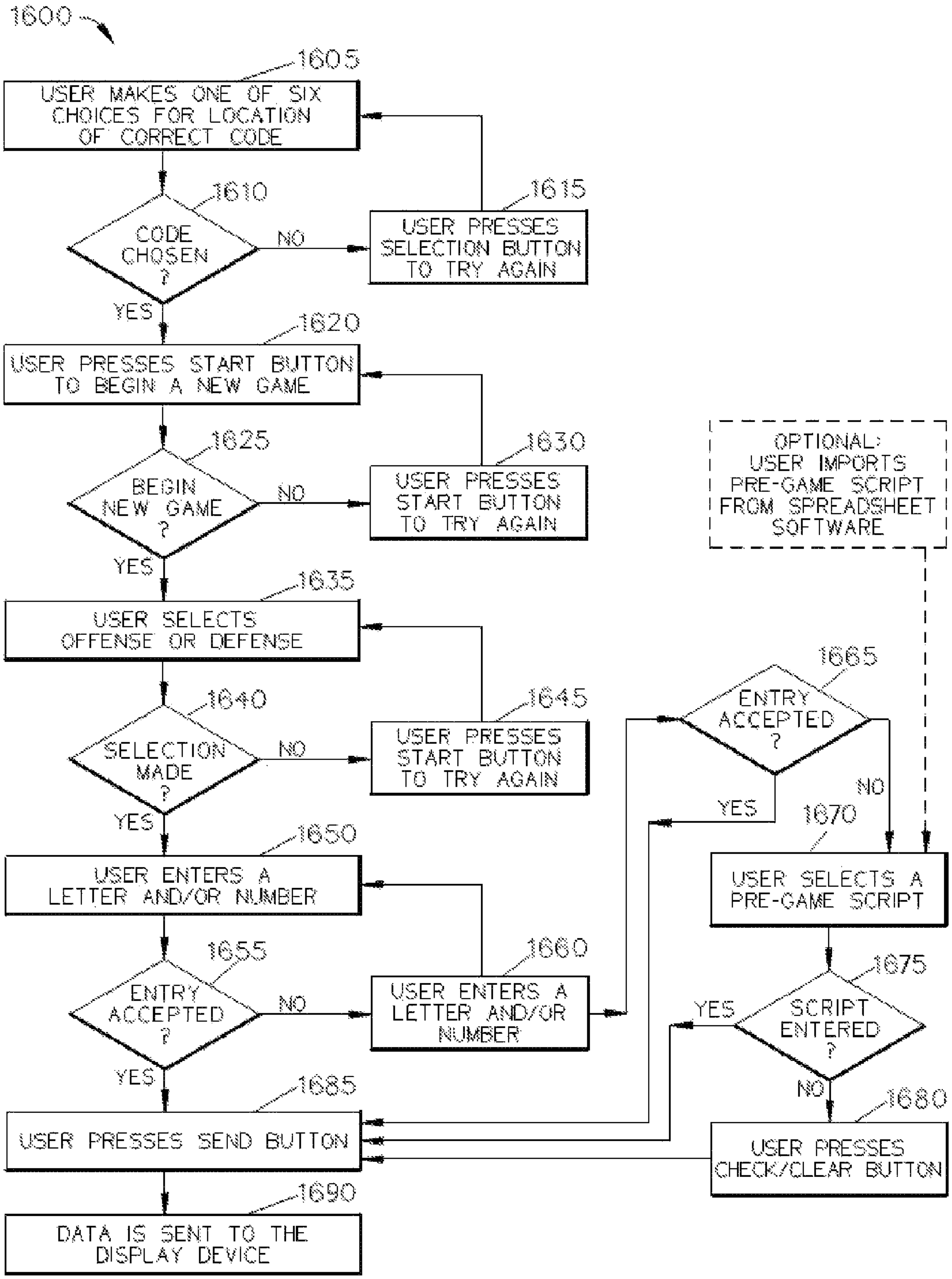

FIG. 16 conceptually illustrates a process for controlling an electronic play caller in some embodiments.

Figure 17:
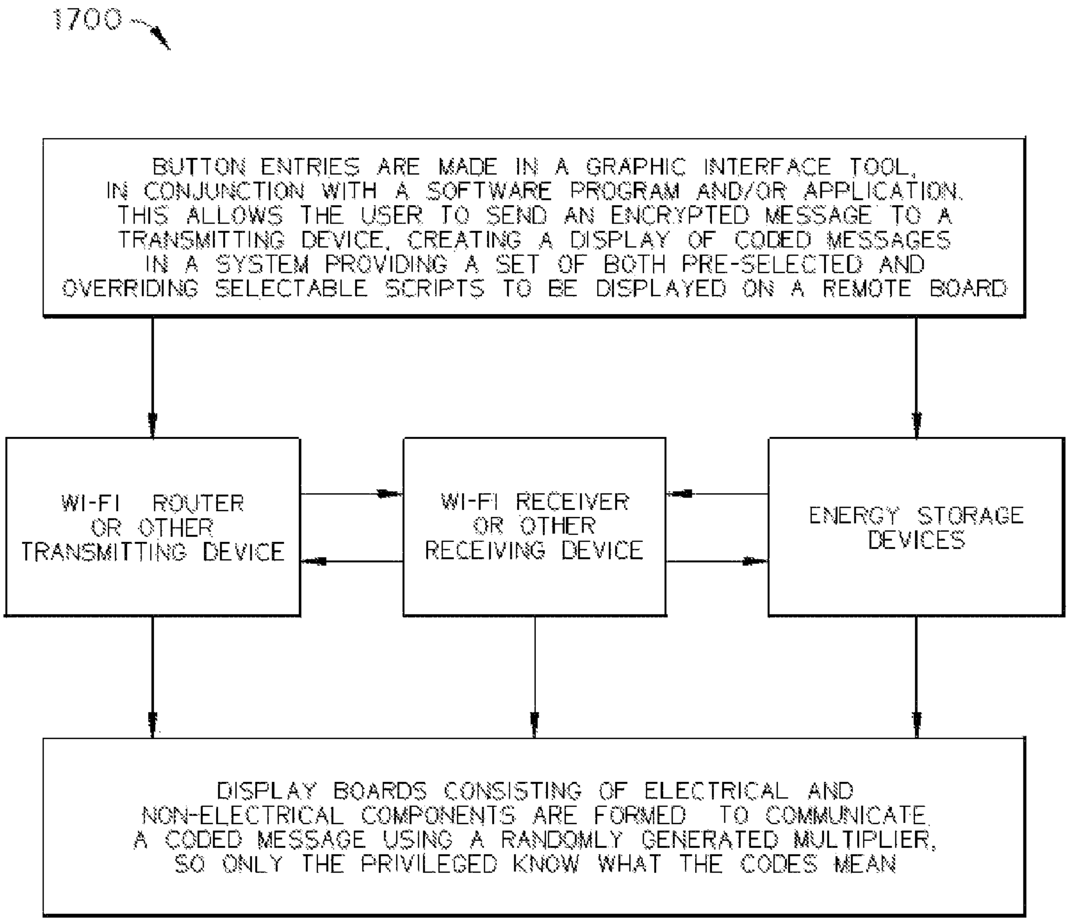

FIG. 17 conceptually illustrates a block diagram of an electronic play caller control system in some embodiments.

Figure 18:
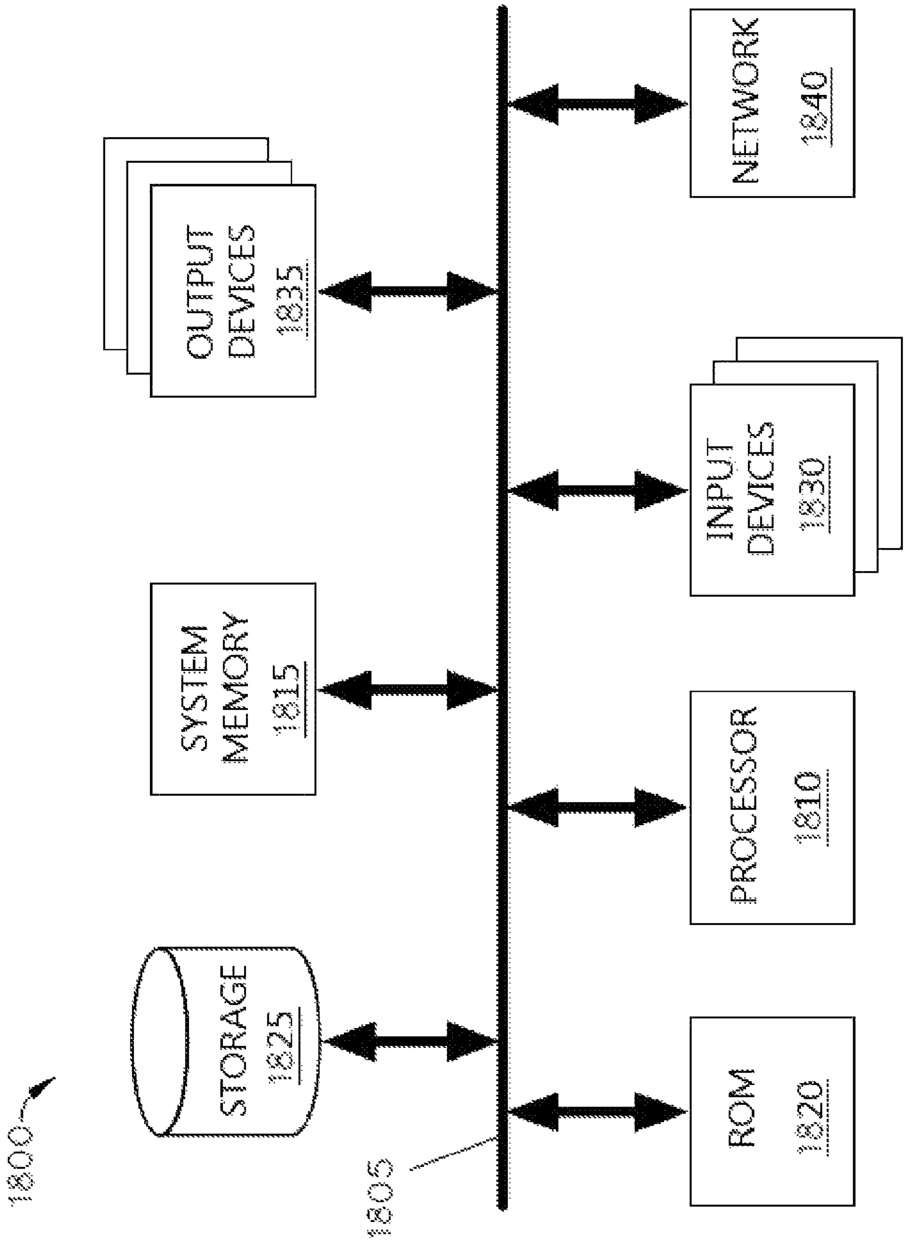

FIG. 18 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several sports including baseball, soccer, Lacrosse, and other team sports.

Some embodiments of the invention provide a novel electronic play calling device for calling plays on a sports field. The electronic play calling device comprises a play calling board, a battery, or AC power, and a plurality of lights attached to the board and configured to illuminate a translated signal that is visible to a set of football players on the football field. The electronic play calling device of some embodiments further comprises a direct current (DC) power source. In some embodiments, the plurality of lights are LED lights. In some embodiments, the battery is a rechargeable battery.

By way of example, FIG. 1 conceptually illustrates a first electronic play caller 10 in some embodiments. The electronic play caller 10 shown in this figure is encased in a housing 12 and includes a front panel LED display region 14. Within the housing 12, the electronic play caller 10 of some embodiments includes a rechargeable battery. The front panel LED display region 14 of the electronic play caller 10 of some embodiments is operated by a rechargeable DC current battery system lasting up to 8 hours on one charge. The lights are LED's. In some embodiments, the housing 12 has a recharging port (not shown) for plugging into a power source to recharge the battery. Thus, the battery can be recharged by plugging in the panels, for example, to any AC 110 watt wall outlet. In some embodiments, the electronic play caller 10 can bypass battery operation and can operate directly from the AC wall outlet power.

In some embodiments, the electronic play caller 10 rests in a stationary position visible to a field of play. In other embodiments, the electronic play caller 10 is mobile. For instance, as shown in FIG. 1, the electronic play caller 10 comes in a thin form factor and includes handles 13 which are held by a carrier operator 16. Using the handles, the carrier operator 16 is able to lift and move the electronic play caller 10 from one position to another. In some cases, the electronic play caller 10 includes a set of wheels 15 which allow the carrier operator 16 to roll the electronic play caller 10 from one position to another.

The electronic play caller of some embodiments further comprises a remote control transmitter for selecting coded plays to display on the board. The remote control of some embodiments transmits coded play selections to the electronic board by at least one of infrared (IR) signals, radio frequency (RF) signals, and WiFi signals. In this way, the electronic play caller can be used during events in which multiple participants need to encode their communication.

By way of example, FIG. 2 conceptually illustrates usage in some embodiments of the first electronic play caller. In this figure, a remote control transmitter 28 is used to send signals to the electronic play caller 10. The transmitter 28 is the size of a standard remote (T.V., DVD, Wii, etc.), but can be any of several sizes in varying embodiments. In this example, a football coach 22 holds the remote control transmitter 28 in his hand and sends a signal 24 to the electronic play caller 10. The signal 24 could be any signal capable of wirelessly transmitting an encoded play selection. For example, the signal could be a WiFi signal, an RF signal, an IR signal, etc. In some embodiments, the electronic play caller 10 includes a signal receiving device (not shown) that is compatible with the type of wireless signal being transmitted by the remote control 28. In this way, the coach 22 can transmit the encoded play to the electronic play caller 10 wherever the carrier operator 16 may move the display.

After receiving the transmitted signal 24, a micro-processor (not shown) of the electronic play caller 10 of some embodiments translates the signal into a set of instructions for lighting up the LEDs according to the encoded play transmitted with the signal 24. Once the encoded play is illuminated on the LED display 14, a player 20 can see which play is called. The player 20 (in this example, a football player) can translate the encoded play by memory recall or by identifying the code in a look up table that is, for example, imprinted on a wristband. Thus, with a clear field of view 26 to the electronic play caller 10, the football player

20 may be positioned far away from the coach 22, yet would be able to clearly receive the play being called.

In some embodiments, the panels of the electronic play caller 10 include electronic circuit boards housing electronic chips, printed circuit boards, receivers, transistors, resistors, capacitors, etc. The panel may include different color LEDs and can remain fully lit, placed in a standby mode, or in an on/off mode as desired. Although the dimensions of the electronic play caller 10 can vary in different embodiments, in at least one embodiment, the electronic play caller 10 includes a 2×5 foot lighted board made using an aluminum or plastic backboard or backing. The thickness of the board is approximately 2 inches, providing a thin form factor for the play caller 10, but can vary in different embodiments. In general, lighter weight materials are preferred but not required. Drilled into the 2×5 foot board is the microprocessor and a printed circuit board (i.e., mother board) with wires, connectors, and at least one antenna to receive signals and a WIFI router. The front casing is also about 5 mm-10 mm thick and has anywhere between 50 to 1000 small colored LEDs. The two casings are attached using a sufficient number of screws (e.g., 8 screws). The back board has a brace screwed into it with a sufficient number of securing screws (e.g., 3 screws), along with rubber molding and silicone adhesive to make it water proof. In some embodiments, the brace allows the board to be attached to a support stand.

In some embodiments, the electronic play caller includes a case for transporting the play caller. While the example above illustrates a single carrier operator 16 lifting and/or rolling the electronic play caller 10, in other embodiments, the electronic play caller 10 includes a large and bulky casing which is securely moved with multiple carrier operators 16.

By way of example, FIG. 3 conceptually illustrates a second electronic play caller 62 that is moved by two carrier operators 16. As shown in this figure, the electronic play caller 62 includes a casing 64 which provides a solid and secure frame for the LED board 14 of the electronic play caller 62. In this example, a set of shoulder straps 18 on each side of the electronic play caller 62 allow the carrier operators 16 to lift and move the electronic play caller 62.

FIG. 4 conceptually illustrates usage of the second electronic play caller 62. Similar to the usage of the first electronic play caller 10, the player 20 in this example has a clear field of view 26 to see the coded plays displayed on the LED board 14 of the electronic play caller 62 when the coach 22 transmits the signals 24 according to the remote control 28 operation. Also, as shown in this example, the player 20 has a clear field of view 26 to the electronic play caller 62 because the shoulder straps 18 are positioned on sides of the play caller 62 which do not cause the carrier operators 16 to obstruct the view of the LED board 14.

In some embodiments, the electronic play caller is mounted on a stationary pole. The pole-mounted electronic play caller may be positioned adjacent to a playing field. In some embodiments, multiple pole-mounted electronic play callers are positioned at opposing sides of a playing field. By way of example, FIG. 5 conceptually illustrates two pole-mounted electronic play callers 66 positioned near a playing field 70. As shown in this figure, each electronic play caller 66 is mounted on a pole 68. The mounting height of the LED display board 14 is high enough for players in the playing field 70 and coaches along the sideline of the playing field 70 to see the codes that are displayed when the coach transmits the play via remote control.

While the example described by reference to FIG. 5 includes two pole-mounted electronic play callers 66, any number of pole-mounted electronic play caller installations may be configured. For example, in one play calling system, each of three pole-mounted play electronic play callers are positioned alongside the playing field. In some embodiments, the positioning of the pole-mounted play callers is based on maximizing visibility of the coded plays for players on the field.

The remote operation of the electronic play caller in some embodiments is performed by any of a plurality of signal transmitting devices. In some embodiments, the plurality of signal transmitting devices includes a remote control transmitter and a mobile computing device. FIG. 6 conceptually illustrates a set of signal transmitting devices including a remote control transmitter 28 and a mobile computing device 40 for controlling an electronic play caller in some embodiments. As shown, the remote control transmitter 28 includes a set of logic gates, one or more signal transmitters (IR, RF, WiFi, etc.), and a set of controller buttons 30 from which a play caller 22 can make a variety of play selections.

The logic gates can be used but are not required in some embodiments. When the logic gates are used, the remote transmitter 28 automatically generates and sends five false play codes (i.e., codes that are not intended by the play caller to be deciphered by players) which are transmitted along with the real play code (i.e., the code that is associated with the play call selection of the play caller). In these embodiments, the false codes are displayed on the electronic LED display board along with the real play code. In some embodiments, more than two false codes are generated, while in other embodiments, only one false code is generated for display on the LED board with the real code.

In some embodiments, the controller buttons 30 include a standard set of alpha-numeric characters. For example, the remote control 28 may include the numbers 0-9 and the 26 letters of the English alphabet. In other languages, the remote control buttons could include letters or characters corresponding to the language. In other embodiments, the remote control buttons could include a set of icons (e.g., depictions of various types of plays).

In some embodiments, the mobile computing device 40 comprises one or more applications which when executed on a processing unit of the mobile device, displays a graphical user interface (GUI) on a display screen of the device. In some embodiments, the GUI comprises a set of play calling GUI tools. In some embodiments, the play calling GUI tools comprise a set of tools for selecting a play to encode and transmit to the electronic play caller 10, a set of tools for defining code-play pairs, and a set of tools for identifying one or more electronic display calling devices 10 to transmit play calling signals 24 to. In some embodiments, the mobile computing device 40 is a tablet computing device, as illustrated in FIG. 6. A mobile computing device that is used as a signal transmitting device of an electronic play caller is described below, by reference to FIG. 15.

Thus, by using a signal transmitting device, play calling is quickly communicated to players by a football coach simply placing the remote in his/her hand, pressing the buttons (e.g., a combination of letters and numbers), and then pressing the send button. Almost instantaneously, the signal would light up on the board for the players to view. Thus, within seconds of the football coach entering the play with the remote control, the players would be translating the signal (e.g., using the code chart on their football wristbands) and executing the play.

The electronic play caller of some embodiments further comprises a support stand for displaying the LED board at any position visible from a playing field. In some embodiment, the stand is a mobile stand, while in other embodiments, the stand is a stationary stand. By way of example, FIG. 7 conceptually illustrates an electronic play caller 32 mounted on a mobile display stand 36 having a set of wheels 34. As shown in this figure, the wheels 34 allow the electronic play caller 32 to be rolled to different positions. Additionally, the support stand 36 can be adjusted vertically to raise or lower the LED display board 14 so all players can see it from the playing field. The mobile display stand includes a base 36 and the set of wheels 34, thereby allowing the electronic play caller 32 to be moved to any of several locations in relation to the playing field. In some embodiments, the set of wheels 34 are poly-filled wheels or tires. In some embodiments, the base 36 is a metal base, while in other embodiments, the base 36 is a plastic base.

FIG. 8 conceptually illustrates an electronic play caller 32 that is mounted on a stationary display stand 36 (i.e., without wheels). Despite a lack of wheels, the electronic play caller 32 can be positioned at any of several sideline locations proximate to and within the field of view of players on the field of play. In some embodiments, the stand 36 can be adjusted vertically to raise or lower the LED display board 14. In addition, the support stand 36 can be swiveled from left to right in order to change the field of view toward which the LED display board 14 is directed.

In some embodiments, the electronic play calling device is part of a play calling system that includes a plurality of play calling devices positioned at a plurality of locations alongside a playing field. One such configuration was described above by reference to FIG. 5 and included multiple pole-mounted electronic play callers positioned along a playing field. Another example configuration includes three stationary play caller stands positioned alongside the playing field in a manner that maximizes the field of view coverage for players on the field. In some of these embodiments, a first stand and play caller is positioned at approximately one quarter of the distance of the field from a first end of the field, a second stand and play caller is positioned at approximately one half of the distance of the field from the first end of the field, and a third stand and play caller is positioned at approximately three quarters of the distance of the field from the first end of the field.

In some embodiments, the play calling system includes a set of rails for moving a plurality of stationary play callers along the sideline of the playing field. In some embodiments, the power source provides power to each of the plurality of play calling devices. In some embodiments, the remote control transmits signals to each of the plurality of play calling devices.

Other mounting configurations are conceived for play calling systems that deploy one or more electronic play callers. By way of example, FIGS. 9-12 illustrate four different mounting configurations that can be used in an electronic play calling system of different embodiments. In particular, FIG. 9 illustrates an example of a large form electronic play caller 46 mounted on a stadium light pole 44 that also holds a set of stadium lights 42, FIG. 10 illustrates an example of an electronic play caller mounted on a tripod 48, FIG. 11 shows an example of a free-standing electronic play caller 50 with a bar 54, straps 56, and small form electronic play callers 58, and FIG. 12 demonstrates an example of a mobile electronic play caller 52 that is used in some configurations.

One benefit of using an electronic play caller system is that play calls are hard to steal. By using enough number/letter combinations, it is virtually impossible to crack the play calling code in real-time (i.e., during actual play). In some embodiments, the number of alpha-numeric characters used is configurable. However, in at least one embodiment, five alpha-numeric characters are used, each character potentially being a number (i.e., 0 to 9) or a letter (i.e., any of the 26 letters of the alphabet). In some cases, the case of a letter can further distinguish the characters displayed for a coded play. This gives a play caller a tremendous advantage when sending a signal.

By way example, FIG. 13 conceptually illustrates a schematic 1300 of a system for controlling an electronic play caller in some embodiments. As shown in this figure, the plays are encoded by number and letter. The first play in the example order is coded as A1, the second play B2, the third play C3, and the fourth play D4. The frequency with which such plays are called is also provided in some embodiments. As shown on the bottom right of this figure, the play A1 was called for seven times, the play B2 was called for fifteen times, the play C3 was called for two times, and the play D4 was not called for at all. All such data can be transmitted/imported to a spreadsheet for analysis and evaluation, for example, before the game or after the game.

In addition to the combinatorial nightmare presented to opposing teams by the sheer number of alpha-numeric-symbol character combinations, the number of codes can vary too. In some embodiments, up to six signals can be displayed on the LED display board simultaneously. The six signals of some embodiments includes five false signals and one true signal (i.e., the actual play being called) that corresponds to a code on the football wristband. In this way, the names of plays are never transmitted and interception of the signals does not in any way change the integrity of the play or of its name or the call itself since the opposing team has no practical way to decipher the code in time.

Other measures are included in the system. For example, the wristband can include multiple color-coded play charts. If a team/coach suspects that their wristbands/plays have been compromised, the coach simply changes the color from red to blue or white (or any other color). The following is an example. Prior to the game, the coach tells his players that the code will be sent in the RED LED's; i.e. "A9" aka Alpha 9. The players look at the lighted board, translate the signal, look at their wristbands, and then immediately execute the play. The advantage is that no huddle is needed nor any oral directions, physical (hand gestures) signals or pictorial signs are needed to communicate with the players. At any time, the coach can change the color of the signal (at half time or the next game) and the play calling still remains the same. In some embodiments, the colors are the same but the position of the "real" code is communicated to the players prior to the game (e.g., "section 3").

As noted above, the signal transmitting device that a coach uses on the sideline may be a mobile computing device. By way of example, FIG. 14 conceptually illustrates a schematic 1400 of a mobile computing device application interface for controlling an electronic play caller in some embodiments. As shown in this example, the coach would have a full range of letters and numbers from which to call encoded plays. Furthermore, the coach would have the ability to set the number of digits to be used for an encoding, and set other configuration parameters, such as password protection, the location/position in an array of codes in which the actual true play is located, a set of set-up options, the length of time encoded plays are to be displayed on the LED display board, etc.

FIG. 15 conceptually illustrates an example 1500 of a graphical user interface of an application for controlling an electronic play caller in some embodiments. As shown in this example 1500, a mobile computing device 74 includes a display screen which displays a graphical user interface 72 of a play signal calling application (in this example, called "ePlayCaller") that runs on a processor of the mobile computing device 74.

The play signal calling application that runs on the mobile computing device 74 implements a play calling and transmitting process. By way of example, FIG. 16 conceptually illustrates a process 1600 for controlling an electronic play caller in some embodiments. As shown in this figure, the process 1600 starts with a user setting (at 1605) a location in which the code associated with an actual play is to be positioned in an array of positions across the LED display board of the electronic play caller. If the process 1600 determines (at 1610) that a code was not chosen, the process will wait (at 1615) for the user to press selection button to choose a location (at 1605) again. If the user did choose a location, then the process transitions to 1620 for the user to press the start button to begin a new game. If the process 1600 determines (at 1625) that a new game was not started, the process will wait (at 16130) for the user to press the start button again.

On the other hand, if the start button started a new game, then the process 1600 transitions to 1635 for the user to select offense or defense for play calling in the new game. If the process determines (at 1640) that no selection (of either offense or defense) was made, the process waits (at 1645) for the user to make a selection of a mode (offense or defense), transitioning back to 1635 to receive selection of the mode. If the process determines (at 1640) that the user made a selection (either offense or defense), then the process transitions to 1650 to allow the user to input a set of letters and/or numbers for one or more codes to display on the LED display board of one or more electronic play callers.

In some embodiments, the user can input a character that is invalid, in which case the process 1600 would reject the input. Thus, the process determines (at 1655) whether the user input was acceptable. If the process 1600 determines that the input was acceptable, the process waits for the user to press the send button (at 1685) in order to transmit the encoded play signal to the electronic play caller for display on the LED display board. On the other hand, if the input was not acceptable, the process 1600 waits for the user to enter a new set of numbers and/or letters for the code. The process of some embodiments reverts to 1650 for further processing as described above.

In some other embodiments, the process 1600 determines (at 1665) whether the new entry was accepted. If yes, the process transitions back to 1685, as described above. If no, the process transitions to 1670 so that the user can select a pre-game script of plays to call during the game. In some embodiments, the user may have imported a pre-game script from a program, a text file, a spreadsheet, etc. Whether the pre-game script was imported or generated on the mobile computing device in real-time, the process 1600 next determines (at 1675) whether any script was entered. If a script was determined to be entered, the process transitions back to 1685 to allow the user to press the send (play signal) button. If not, the process waits (at 1680) for the user to press a check/clear button on the device. Then the process returns to 1685 to wait for the user to send the play code signal to the electronic play caller. Finally, the process transmits the encoded play signal to the electronic play caller for display on the LED display board of one or more play callers.

The existing play calling schemes are all too slow and cumbersome. As the game of football progresses, the time between each play has decreased and has given an advantage to the team who can execute at a faster rate. The system improves the speed by increasing the rate at which a play is delivered and executed. By using the system, plays can be routinely executed in approximately ten seconds as opposed to the 20-35 second range common with current football play-calling schemes. In some embodiments, the speed of the system is related in part to the architecture of the electronic play calling system. By way of example, FIG. 17 conceptually illustrates a block diagram of an electronic play calling system architecture in some embodiments. As shown in this figure, the system 1700 includes a transmitting device that is in communication with a WiFi router or other data transmitting device, a WiFi receiver or other data receiving device, and energy storage devices, each of which is communicatively connected to one or more electronic play callers having LED display boards for displaying encoded play signals in real-time as they are selected by a coach or person using the remote during a game.

In addition to the example described above in relation to sports play calling, and in particular football play calling, in some embodiments, the play calling system can be used in other realms. For instance, it could be deployed in advertising, for example, in a stadium where lots of people gather together. With a few alterations, the system could send out personalized messages via the message boards. Other embodiments as might normally be expected with display screens are also envisioned by the systems and devices described in this specification.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention.

Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 18 conceptually illustrates an electronic system 1800 with which some embodiments of the invention are implemented. The electronic system 1800 may be a computer, phone, PDA, or any other sort of electronic device. Such an electronic system includes various types of computer readable media and interfaces for various other types of computer readable media. Electronic system 1800 includes a bus 1805, processing unit(s) 1810, a system memory 1815, a read-only 1820, a permanent storage device 1825, input devices 1830, output devices 1835, and a network 1840.

The bus 1805 collectively represents all system, peripheral, and chipset buses that communicatively connect the numerous internal devices of the electronic system 1800. For instance, the bus 1805 communicatively connects the processing unit(s) 1810 with the read-only 1820, the system memory 1815, and the permanent storage device 1825.

From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1820 stores static data and instructions that are needed by the processing unit(s) 1810 and other modules of the electronic system. The permanent storage device 1825, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1825.

Other embodiments use a removable storage device (such as a floppy disk or a flash drive) as the permanent storage device 1825. Like the permanent storage device 1825, the system memory 1815 is a read-and-write memory device. However, unlike storage device 1825, the system memory 1815 is a volatile read-and-write memory, such as a random access memory. The system memory 1815 stores some of the instructions and data that the processor needs at runtime. In some embodiments, the invention's processes are stored in the system memory 1815, the permanent storage device 1825, and/or the read-only 1820. For example, the various memory units include instructions for processing appearance alterations of displayable characters in accordance with some embodiments. From these various memory units, the processing unit(s) 1810 retrieves instructions to execute and data to process in order to execute the processes of some embodiments.

The bus 1805 also connects to the input and output devices 1830 and 1835. The input devices enable the user to communicate information and select commands to the electronic system. The input devices 1830 include alphanumeric keyboards and pointing devices (also called "cursor control devices"). The output devices 1835 display images generated by the electronic system 1800. The output devices 1835 include printers and display devices, such as cathode ray tubes (CRT) or liquid crystal displays (LCD). Some embodiments include devices such as a touchscreen that functions as both input and output devices.

Finally, as shown in FIG. 18, bus 1805 also couples electronic system 1800 to a network 1840 through a network adapter (not shown). In this manner, the computer can be a part of a network of computers (such as a local area network ("LAN"), a wide area network ("WAN"), or an intranet), or a network of networks (such as the Internet). Any or all components of electronic system 1800 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 16 conceptually illustrates a process. The specific operations of this process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. An electronic play calling system that visually outputs encoded plays to a set of players on a playing field, the electronic play calling system comprising:

a plurality of play calling devices visible to the players from a sideline area that is adjacent to and surrounds the playing field, wherein each electronic play calling device comprises a play calling board, an antenna for receiving signals from a remote control transmitter, a plurality of LEDs that are attached to the play calling board and configured to illuminate a multi-colored alpha-numeric pattern of LEDs in at least two colors to represent a translated signal of an encoded football play that is received from the remote control transmitter when a play caller enters the encoded football play to transmit with the remote control transmitter, a battery that provides at least one of a DC power supply and an AC power supply for powering the LEDs, and a housing that encases the battery and play calling board with the attached LEDs, wherein at least one electronic play calling device is a rolling electronic play calling device comprising a set of wheels fastened to a bottom side of the rolling electronic play calling device; and a set of rails on which the wheels of the rolling electronic play calling device fit to move the rolling electronic play calling device along the sideline area adjacent to the playing field.

2. The electronic play calling system of claim 1, wherein the housing that encases the battery and play calling board of the rolling electronic play calling device is a thin form housing, wherein the rolling electronic play calling device further comprises a set of handles for a rolling operator to move the rolling electronic play calling device on the set of rails along the sideline area adjacent to the playing field.

3. The electronic play calling system of claim 1, wherein the play calling board of a mobile electronic play calling device that is different from the rolling electronic play calling device is positioned along a first side of the mobile electronic play calling device, wherein the housing that encases the battery and the play calling board of the mobile electronic play calling device is a bulky framed-box housing, wherein said mobile electronic play calling device further comprises a plurality of straps comprising a first pair of shoulder straps attached to a second side of the housing for a first carrier operator to use in carrying the mobile electronic play calling device and a second pair of shoulder straps attached to a third side of the housing for a second carrier operator to use in carrying the mobile electronic play calling device.

4. The electronic play calling system of claim 3, wherein the first and second carrier operators simultaneously carry the mobile electronic play calling device along the sideline area adjacent to the playing field.

5. The electronic play calling system of claim 1, wherein at least one of the electronic play calling devices in the plurality of electronic play calling devices is a pole-mounted electronic play caller in which the play calling board connects to a stationary pole that is secured to a specific location within the sideline area adjacent to the playing field.

6. The electronic play calling system of claim 5 further comprising a tripod mount on which to mount the play calling board of an electronic play calling device, wherein at least one of the electronic play calling devices in the plurality of electronic play calling devices is a tripod-mounted electronic play calling device in which the play calling board of the tripod-mounted electronic play calling device is mounted on the tripod mount at a temporary stationary location within the sideline area adjacent to the playing field.

7. The electronic play calling system of claim 6, wherein the tripod mount comprises a set of wheels for moving the tripod-mounted electronic play calling device from the temporary stationary location to a different location within the sideline area adjacent to the playing field.

8. A non-transitory computer readable medium storing a program which, when executed by at least one processing unit of a mobile computing device, transmits an encoded play call to a rolling electronic play caller that moves along a set of rails adjacent to a playing field and displays the encoded play call on an LED board of the rolling electronic play caller, said program comprising sets of instructions for:

displaying a graphical user interface (GUI) on a screen of the mobile computing device, wherein the GUI includes a set of selectable GUI play calling tools comprising a plurality of selectable alpha-numeric GUI buttons, a plurality of selectable action GUI buttons, a pre-game script graphical area, a play code display locator graphical area, a plurality of visual output display buttons, and a play list graphical area;

receiving selections of a set of selectable alpha-numeric GUI buttons corresponding to a specific combination of alpha-numeric symbols that make up a code associated with an actual play that a coach intends a team to perform;

generating a plurality of randomized decoy codes, each randomized decoy code comprising a random combination of alpha numeric symbols;

receiving a selection of a particular visual output display button from the plurality of visual output display buttons, wherein the particular visual output display button corresponds to the LED board of the rolling electronic play caller;

receiving a selection of a location within the play code display locator graphical area, wherein the play code display locator graphical area comprises a scaled representation of a geometric area of the LED board of the rolling electronic play caller, wherein the location within the play code display locator graphical area approximates a corresponding location of the geometric area of the LED board of the rolling electronic play caller;

receiving a selection of a real code position configuration button that sets the code associated with the actual play to the selected location within the play code locator graphical area and sets the plurality of randomized decoy codes to remaining locations in the play code locator graphical area;

receiving a selection of a particular action GUI button from the plurality of selectable action GUI buttons, wherein the particular action GUI button corresponds to a send action; and transmitting the code associated with the actual play and the plurality of randomized decoy codes to the rolling electronic play caller for display on the LED board of the rolling electronic play caller, wherein the selected location within the play code locator graphical area corresponds to a specific location of the geometric area of the LED board of the rolling electronic play caller, wherein the code associated with the actual play is visually output to the specific location of the geometric area of the LED board of the rolling electronic play caller and the plurality of randomized decoy codes are visually output to remaining locations in the play code locator graphical area.

9. The non-transitory computer readable medium of claim 8, wherein the LED board of the rolling electronic play caller comprises a two-dimensional array of cells, wherein each cell comprises a set of LED lights that allow any alpha-numeric code to be displayed in the cell.

10. The non-transitory computer readable medium of claim 8, wherein the program further comprises sets of instructions for:

receiving a pre-game script comprising a set of play codes associated with a set of plays and a pre-determined play sequence, wherein the pre-game script is pre-configured to transmit the play codes and randomized decoy codes to the LED board of the rolling electronic play caller in the pre-determined play sequence in real-time during a game; and importing the pre-game script into the program.

11. The non-transitory computer readable medium of claim 10, wherein the set of instructions for receiving a selection of a particular action GUI button comprises a set of instructions for overriding transmission of a particular play code of the pre-game script.

12. The non-transitory computer readable medium of claim 11, wherein transmission of the overrode particular play code of the pre-game script is delayed until after the actual play is completed.

13. The non-transitory computer readable medium of claim 11, wherein the particular play code of the pre-game script is skipped and a next play code of the pre-game script is transmitted after the actual play associated with the code is completed.

14. The non-transitory computer readable medium of claim 8, wherein the corresponding location of the geometric area of the LED board of the rolling electronic play caller comprises a plurality of LED lights.

15. The non-transitory computer readable medium of claim 8, wherein the set of instructions for generating the plurality of randomized decoy codes comprises sets of instructions for:

generating a plurality of random multiplier values; and using a random multiplier value from the plurality of random multiplier values to select a combination of alpha numeric symbols for each randomized decoy code to transmit to the rolling electronic play caller.

16. The electronic play calling device of claim 1, wherein the electronic play calling device is free-standing electronic play caller comprising a first play board and a second play board that hang from a bar by a pair of straps, wherein a first end of each strap in the pair of straps is fastened to the bar, a middle length of each strap fastens around the first play board, and an opposing second end of each strap is fastened to a second play board that hangs beneath the first play board.

* * * * *